United States Patent
Krehnke et al.

[11] Patent Number: 6,014,746
[45] Date of Patent: Jan. 11, 2000

[54] WORKSTATION LOCK AND ALARM SYSTEM

[75] Inventors: David C. Krehnke, Lenoir City; Kibbee D. Streetman, Oak Ridge; Mollie E. Krehnke, Lenoir City; Michael R. Moore, Corryton; Eddie R. Tapp, Jacksboro, all of Tenn.

[73] Assignee: Lockheed Martin Energy Research Corporation, Oak Ridge, Tenn.

[21] Appl. No.: 08/804,174

[22] Filed: Feb. 21, 1997

[51] Int. Cl.[7] .................................................. G06F 12/14
[52] U.S. Cl. ............................................................ 713/200
[58] Field of Search .................................... 713/200, 201, 713/202; 714/4

[56] References Cited

U.S. PATENT DOCUMENTS

| | | | |
|---|---|---|---|
| 4,882,752 | 11/1989 | Lindmas et al. | 380/25 |
| 4,975,950 | 12/1990 | Lentz | 380/4 |
| 5,121,345 | 6/1992 | Lentz | 364/550 |
| 5,805,910 | 9/1998 | Lee et al. | 395/750.05 |
| 5,910,987 | 6/1999 | Ginter et al. | 380/24 |
| 5,915,019 | 6/1999 | Ginter et al. | 380/4 |

OTHER PUBLICATIONS

SB–1 Safeboot with Cryptoc Technology and Authentication Cryptocard (1994).
Watchdog PC Data Security Promotion Promotional Literature from Fischer International Systems Corporation (1993).
SmartDisk Promotional Literature from SmartDisk Security Corporation (1994).
SafeBoot PC Serucity System: First Look Datapro Report (May 1994).
S & S News and view for Spring 1996 (Jun. 1996).

*Primary Examiner*—David Y. Eng
*Attorney, Agent, or Firm*—Lockheed Martin Energy Research Corporation

[57] ABSTRACT

The system of the present invention provides physical access control for storage media in stand-alone workstations which are processing classified or unclassified sensitive information. The system protects the workstation media from theft, tampering and from observation of the monitor by passers-by. The system, when invoked, presents an alarmed-state security screen, allows only passwords to be entered from the keyboard, and protects writable media from access or removal. An alarm sounds if (a) any drives (both internal and external) containing writable media are opened or removed, (b) the program is interrupted, (c) too many invalid password characters are entered, or (d) the power is interrupted.

21 Claims, 14 Drawing Sheets

WORKSTATION LOCK AND ALARM SYSTEM

BACKGROUND OF THE INVENTION

I. Field of the Invention

The present invention relates to the field of computer security. In particular, the present invention relates to a workstation lock for thwarting unauthorized access to information contained on the workstation and alerting users of tampering with the workstation.

II. Background of the Invention

The need for a multifaceted approach to information protection on workstations and personal computers ("PCs") has been well documented. Using a security product and removable media can increase the level of protection, however, even these systems are subject to compromise in various ways.

The robustness and usefulness of existing security products vary widely. Some of these products are software only, some are hardware only, and some are a combination of both. The cost of these products ranges from no cost for software-only freeware to several thousand dollars for security containers housing various PC components. Many of the access-control products provide capabilities for differentiating levels of access (e.g., security officer, employee supervisor or data owner, and user) and multiuser access, which, more often than not, go unused in a typical office environment where most workers have their own PCs.

With physical access, a skilled intruder with a prepared methodology can acquire information thought to be protected by one or more of these commercial access-control products. Possible methods of intrusion generally associated with PCs, some of which may be effective even if a security product is being used, include: 1) access to the keyboard to display, transmit, or alter information; 2) access to the keyboard to allow time for password guessing; 3) removal of PC media including diskettes, disk drives, hardcopy, or printer ribbons; 4) observation of information on the video display or monitor; 5) bypass, removal, or disconnection of security product hardware from the PC; 6) insertion of transmitting or recording devices in the PC; 7) boot up from a floppy disk, circumventing the security product startup and verification procedure; and 8) access to a media drive, resulting in the insertion of malicious code.

Denial of physical access to the PC in an office environment can be implemented in a variety of ways: vault-type rooms, security containers with pull-out drawers containing large built-in disk drives, workstation cabinets, PC key locks that lock the case and/or keyboard, cases secured by storage-shed-type clasps with padlocks, tamper proof seals, and office doors. While these mechanisms provide various levels of protection during the day and/or at night, an alternative optimized system for protection, especially during the day and preferably even when information is being processed, has been missing from the security officer's arsenal of control mechanisms.

Also, an unattended PC where classified or sensitive information is being processed requires physical and administrative controls at all times to deter or detect an unauthorized access.

In addition, while some current PC security products address file access controls, including discretionary access controls and encryption, these products do not provide physical protection for the PC components, such as the disk drives, keyboard, and mouse. These components can be used to circumvent the PC security product's protection features. For instance, numerous security products may be circumvented upon gaining access to the keyboard or one of the disk drives.

In other security devices, other shortcomings often arise. For example, in many systems, if the power is removed, the security product ceases to function. If there is no power in the battery, the system could be circumvented if the regular power source is cut off. Some security products can be defeated by simply bringing in a separate keyboard and plugging it in. Still other PC security products provide an audit capability to document accesses to files as pre-defined by the system administrator. However, the review of audit files is a very timely process, and is, therefore, inefficient and not often undertaken. The review of audit files could take more time than powering down the PC, removing the media from the PC, locking it up in a repository before leaving the office, and reinstalling it upon return and, therefore, is not desirable.

Also, because most PC security products address file access controls, including discretionary access controls and encryption, such features protect a file, but do nothing to protect the PC while in operation. Often, PC security products do not allow processing to continue while maintaining protection of the PC.

In still other systems, it is possible for an intruder to place a diskette into a floppy diskette drive and plant a program on the system that will either 1) allow access to the PC at a later time or 2) permit the intruder to plant a program to steal files and place them on the diskette.

Therefore, there exists an urgent need for workstation security products that protect multiple components of the PC (i.e., screen, internal and external devices and removable media, keyboard and mouse) from physical access while the PC is in operation. In addition, there exists a need for a workstation security product that permits users to continue processing sessions (e.g., a long processing jobs which are undesirable to interrupt, either intentionally or unintentionally) even if the users only need to leave the vicinity of their workstations for short periods of time.

SUMMARY OF THE INVENTION

It is one object of the present invention to provide a system that, when armed, protects the personal computer, keyboard, mouse, and external drives from physical use or intrusion. It is a further feature to provide such a system where a hardware card alarms in the absence of a signal from a device associated with the system. Once the PC is armed, no media can be inserted into/removed from any armed disk drive, and no portion of the workstation can be used or disconnected, because the card alarms in the absence of an appropriate signal. The signal can, in one embodiment, be a random number which is generated when the PC is armed.

In one embodiment, the program writes a random number on the writeable media contained in any disk drive or a similar device (such as any media that can be treated as a drive, including drives a: through f: (e.g., hard disk, floppy disk, bernoulli disk, magneto optical disk), and monitors for that number on a frequent basis. It is not possible to exchange media such that there is another disk in the drive. It is also not possible to write a program that will substitute values (e.g., present or absent) when the program is checking for media in an armed drive, because a random number is used. It is not possible to guess the random number that the program will select, so media cannot be switched in the disk drives. The card alarms in either the absence of a file at all, or in the absence of a file containing the correct random number.

Moreover, in one embodiment, the system cannot be defeated with a cold or warm reboot of the system. Because no media can be placed in an armed external drive, the system cannot be booted from a floppy diskette. Before the present invention, placing media in a drive could permit circumventing PC security products.

The security mechanism cannot be circumvented through the removal of power (e.g., removing the plug, turning off the power strip, turning off the power to the power supply to which the plug is connected). If the PC is armed, and the power is removed for any reason, such as to steal the PC, the alarm will still sound. In one embodiment, this functionality is accomplished by providing a hardware portion of the system comprising a battery backup and a way to check for receipt of appropriate indicia from the workstation so as not to sound the alarm.

An additional feature of the system, in one embodiment, is that the security mechanism will not arm if the battery is low. This is particularly useful when the system is used for short-term protection, as it less likely that the battery will expire before the user returns and disarms the system of the invention.

In yet another embodiment, when the system is armed, no keystrokes are passed to the PC until the correct password is entered. Since no commands are passed to the PC, it is not possible to use the keyboard to attempt to circumvent the security product.

When armed, the program notifies the user upon his/her return to the PC if a potential break in has been attempted. Thus, the user is notified if any user attempted to enter a password, even if the alarm was not activated. The user can report such attempts in an appropriate manner (e.g., under the direction of the security officer) if the attempt was determined not to have been an accident, but instead to have been a malicious attack.

When armed, by occluding the PC screen (partially or completely) with an armed state logo, the system prevents data from being viewed by casual passers-by, yet still permitting processing to continue in the background. Because the armed state screen occludes data from any application(s) working in background mode, an intruder viewing the screen cannot obtain information in even an unobtrusive manner.

The system allows processing to continue in background mode and, thus, programs in progress can continue if the authorized user must leave the vicinity of the PC for a period of time.

In one embodiment of the system, changes to the alarm timeout setting (to increase or decrease the time that the alarm sounds) require access to the alarm card in one of the slots in the PC central processing unit. Access to the card would require the intruder to remove the PC case, which, depending upon the operating environment, often cannot be done without arousing suspicion during regular working hours with other personnel nearby if the PC is unattended. In addition, a limit switch may be optionally included to cause the system to alarm if the case if opened.

In one embodiment, changes to the alarm timeout setting require a change in the DIP switches and the jumpers. Such changes require an understanding of the software and access to the documentation and the modification, thus, cannot be performed by a novice intruder who is trying to access the PC. In addition, the performance of such changes by someone other than the authorized system administrator would draw attention to the intruder from persons working nearby. The system can, optionally, be configured such that changing the DIP switches while the system is armed causes the alarm to sound. Depending on the response time by enforcement personnel and the risks involved, this option may allow the use of this product during non-work hours to protect required applications.

In another embodiment, the alarm is modified to extend the usefulness of the security device to detect and apprehend intruders rather than just deter them (via the audible alarm) from accessing the PC. As an option, the system includes, rather than an audible alarm at the locus of the PC, a silent alarm and automatic notification of the nearest security office with personnel on duty of the real-time threat to one of their PCs. As an option, communication with the remote alarm/security site is via a modem/dial-out link, the Internet, or a wireless link (e.g., infrared or radio frequency signaling).

In another embodiment, the program monitors all drives, including those that do not contain writable media when the PC is armed. In a still further embodiment, the program checks for the presence of writable media in drives that did not contain media when the program was started to arm the PC.

The present invention provides a security system for detecting unauthorized access to a computer workstation, the computer workstation including at least one writable media, the security system comprising means for creating a data file on the at least one writeable media, wherein the data file has defined characteristics, means for monitoring the writeable media and detecting a change in the defined characteristics of the data file, means, responsive to the detection by the monitoring and detecting means of the change in the defined characteristics of the data file, for generating an alarm signal, and means, responsive to the alarm signal generating means, for outputting the alarm signal to a signal processing means.

In another embodiment, the present invention provides a security system for detecting unauthorized access to a computer workstation, the computer workstation including a data bus and at least one input device connected to the data bus, the security system comprising first means for receiving from a user of the computer workstation an is actuating password, means, responsive to the receiving means, for interrupting the connection of the at least one input device to the data bus, second means for receiving from the user of the computer workstation a deactivating password, means for determining whether the deactivating password is valid, and means, responsive to the determining means, for resuming the connection of the at least one input device to the data bus.

In a still further embodiment, the present invention provides a security system for detecting unauthorized access to a computer workstation, the security system comprising means for, at a preselected interval, generating signals corresponding to an actuated state of the security system, detection means for detecting the actuated state signals, counter means for counting a time sequence, reset means, responsive to the detection means, for resetting the counter means, means, responsive to the counter means, for comparing time sequence of the counter means to a predetermined security threshold time period, and means, responsive to the comparing means, for outputting a security signal to a signal processing means if the time sequence of the counter means exceeds the predetermined security threshold time period.

In another embodiment, the present invention provides a security system for detecting unauthorized access to a computer workstation having a defined physical state, the security system comprising means for, at a preselected intervals, generating signals corresponding to a nonbreach in the physical state of the workstation, detection means for detecting the nonbreached physical state signals, counter means for counting a time sequence, means, responsive to the counter means, for comparing the time sequence of the counter means to a predetermined security threshold time period, and means, responsive to the comparing means, for outputting a signal to a signal processing means if the time sequence of the counter means exceeds the predetermined security threshold time period.

In a further embodiment, the present invention provides a method for detecting unauthorized access to a computer workstation, the computer workstation including at least one writable media, the method comprising creating a data file on the at least one writeable media, wherein the data file has defined characteristics, monitoring the writeable media and detecting a change in the defined characteristics of the data file, in response to the detection of the change in the defined characteristics of the data file, generating an alarm signal, and, in response to the alarm signal, outputting the alarm signal to a signal processing means.

In yet another embodiment, the present invention provides a method for detecting unauthorized access to a computer workstation, the computer workstation including a data bus and at least one input device connected to the data bus, the method comprising receiving from a user of the computer workstation an actuating password, and, in response to receipt of the actuating password, interrupting the connection of the at least one input device to the data bus, receiving from the user of the computer workstation a deactivating password, determining whether the deactivating password is valid, and, in response to the determination, resuming the connection of the at least one input device to the data bus.

In a still further embodiment, the present invention provides a method for detecting unauthorized access to a computer workstation, the method comprising, at a preselected interval, generating signals corresponding to an actuated state of the security system, detecting the actuated state signals, counting a time sequence, in response to the detection, resetting the counter, in response to the counter, comparing time sequence of the counter to a predetermined security threshold time period, and, in response to the comparing, outputting a security signal to a signal processing means if the time sequence of the counter means exceeds the predetermined security threshold time period.

The present invention also provides a method for detecting unauthorized access to a computer workstation having a defined physical state, the method comprising, at a preselected intervals, generating signals corresponding to a nonbreach in the physical state of the workstation, detecting the nonbreached physical state signals, counting a time sequence, in response to the counter, comparing the time sequence of the counter to a predetermined security threshold time period, and in response to the comparing, outputting a signal to a signal processing means if the time sequence of the counter exceeds the predetermined security threshold time period.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE PREFERRED EMBODIMENTS

Figure 1:
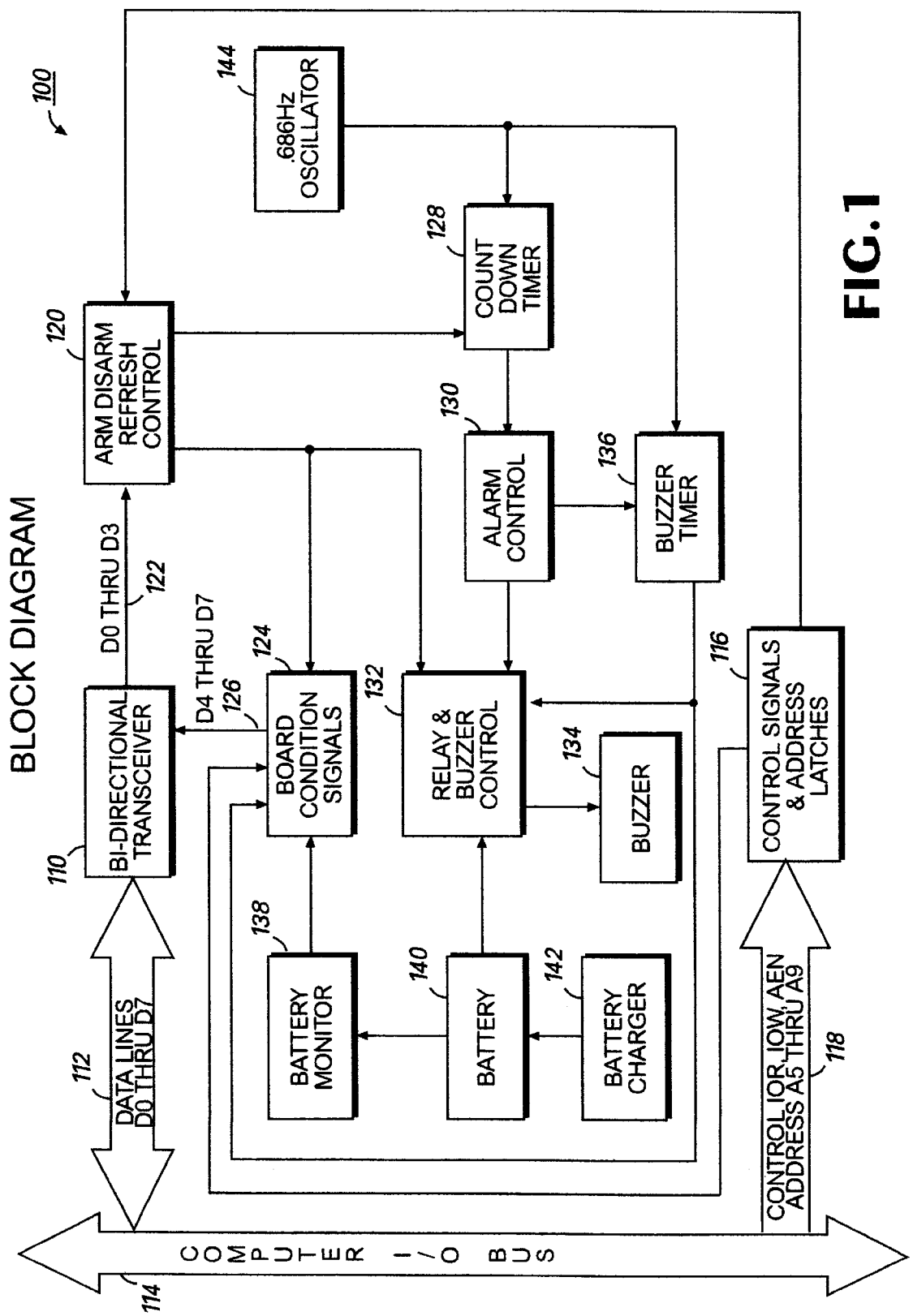
FIG. 1 shows a block diagram of the hardware portion of the present system.

The present invention may be understood more readily by reference to the following detailed description of preferred embodiments of the invention and the Figures.

Before the present methods and apparatuses are disclosed and described, it is to be understood that the terminology used herein is for the purpose of describing particular embodiments only and is not intended to be limiting. It must be noted that, as used in the specification and the appended claims, the singular forms "a," "an" and "the" include plural referents unless the context clearly dictates otherwise.

Throughout this application, where publications are referenced, the disclosures of these publications in their entireties are hereby incorporated by reference into this application in order to more fully describe the state of the art to which this invention pertains.

As used herein, the term "writable media" includes, but is not limited to, floppy disk drives, hard disk drives, bemoulli disk drives, or magneto-optical disk drives and the associated data containers to which such devices write data.

In one embodiment, the system of the present invention comprises a printed circuit card that occupies one slot of the PC chassis and software that operates in the foreground on the PC, yet allows other programs to continue processing in the background. While for the purposes of describing the present preferred embodiment, the software was written for the Microsoft® Windows™ operating environment, one of ordinary slide in the art could readily extend the system to other computers and operating systems without undue experimentation.

Software residing in the foreground prompts the user for a password to arm the PC lock and, in one embodiment, requires that the same password be entered to disarm the lock. One of ordinary skill in the art would recognize that other methodologies could be used to match arming and disarming passwords without altering the basic and novel characteristics of the invention, such methodologies including, but not limited to, correlated passwords, public/private keypairs and the like. After arming the system, any use or tampering with the system without first entering the correct password (subject to predetermined failure criteria) causes the alarm to sound.

The software program continuously checks to make sure the writable media are still present, and an alarm sounds if any writable media have been removed or inserted into a floppy diskette drive or other media recording means. In one embodiment, files are placed on writable media in various drives of the system, such as, but not limited to, drives A through F (of an MS-DOS/Windows based system), at arming time and then continuously monitored until disarmed. The user or operator (i.e., the person who armed the PC) is informed of any failed authentication attempt(s) (i.e., as discussed infra less than, e.g., 20 keystrokes are entered, so the alarm does not sound).

In an alternate embodiment, the program checks the removable media for a pre-recorded encrypted checksum which has been placed on the removable media prior to the current use in the workstation.

The circuit card contains a battery backup that continues to drive a 100 db alarm even if power on the PC is interrupted. The system of the invention notifies the authorized user when the battery power is low and the battery needs to be replaced. In one embodiment, if the battery is low, the system will not let the user arm the system until the battery is replaced.

While many PC security products can be circumvented (often through the use of a boot up diskette or the keyboard) if the machine can be physically accessed when it is powered on, the present invention also prevents otherwise undetectable physical access to the PC under such circumstances. The software program which forms a part of the present invention continuously checks to make sure the writable media are still present, and an alarm is sounded if any writable media has been removed, inserted or otherwise tampered with. Files are placed on writable media at arming time and are continuously monitored for existence and integrity until the system is disarmed.

Procedurally, a workstation with classified or unclassified sensitive information must be secured when the authorized user is not present. This usually requires securing the classified or unclassified sensitive hard drive (e.g., locking the removable drive in a drawer, file cabinet or safe) and turning off the machine. The present invention allows processing to continue in the background mode while no human being is present at the PC; yet adequately protects the PC and the information, if a cleared employee is in the appropriate area to respond to an alarm.

When activated, the software determines which drives contain writable media to be monitored and protected. A random number signature file is placed on writable media in the drive(s) being monitored. The software subsequently checks for the presence and integrity of this file on the protected media.

In one embodiment, the hardware portion of the present invention is installed in an 8-bit slot of a DOS-based PC to provide physical access protection to an unattended PC processing or containing classified or sensitive information. When invoked, the system blanks or occludes the workstation screen of data and presents the alarmed-state security screen. The system allows only passwords to be entered from the keyboard, and protects writable media from attempted access, tamper or removal. An alarm sounds if (a) any drives containing writable media are opened, tampered with, or removed, (b) the program is interrupted (e.g., CTRL-ALT-DEL), (c) too many invalid password characters are entered, or (d) the power is interrupted.

In one embodiment, the alarm circuit card and associated software are intended for use in the temporary securing of a PC processing or containing classified or sensitive information. This particular embodiment is not intended to secure personal computer systems overnight, for extended periods of time, or if no other cleared employee is in the immediate vicinity to respond to the alarm.

The hardware circuitry consists of a logic stage, an alarm driver, a battery backup circuit and the alarm itself. Software residing in the foreground prompts the user for a code (password) to arm the PC lock and, in one embodiment, requires that the same code be entered to disarm the lock. The software program continuously checks to make sure the writable media are still present, and an alarm will sound if any writable media has been removed.

In addition, to provide further assurance, tamper proof seals may be installed on each of the workstations to ensure that the cases have not been opened. These seals could be of the frangible label type with a bar code or serial number that could be inventoried periodically. Any attempt to remove the seal would destroy it and provide evidence that the equipment may have been compromised. Moreover, the tamper proof seals could be electronically monitored, e.g., for a break in an electrical circuit, etc., and used as an input parameter by the system to thereby automatically actuate the alarm. Such monitoring could include the use of a sensing device which would detect a change in the position of the cover on the PC, especially where the cover would not have to be completely removed to trigger the alarm.

In a further embodiment, the system includes sensors capable of detecting the removal of the alarm card from the PC slot into which it is installed.

In one embodiment, only the write-enabled media are monitored because the program writes a small file to them containing a random number generated at run-time. However, one of ordinary skill in the art would recognize that, in an alternate embodiment, read-only media could be monitored by, e.g., cataloguing a unique identifier associated with each, or choosing a random file on each, and continuously checking the read-only media for the presence of the media and the specified identifier or file.

Before running the program for the first time, the alarm card is inserted into the computer. The DIP switches are set to an unused address, and the software automatically finds the alarm card.

For standard PCs, the alarm card is preferably placed in slot 1 if possible because of the thickness of the piezoelectric alarm and battery. Also, placement in slot 1 is optimal for transmission of sound outside the computer case. If the alarm card must be placed in another slot, the installer should prevent mechanical interference with the piezoelectric alarm or placement of the card in such a way that it significantly decreases the volume outside the case.

The default time-out is set with jumpers on the card. The card alarms until the timeout expires, and will alarm again if the computer loses power. In one embodiment, altering the jumpers permits time-outs ranging from three minutes to infinity to be achieved. Note that using a time-out of infinity can cause the alarm to sound for an unacceptably long period of time if the user forgets the password or a false alarm is generated. However, one of ordinary skill in the art could readily extend the system to use any arbitrarily determined duration, or could simply remove the jumpers and associated hardware altogether and use equipment which would provide a set or fixed duration.

The DIP switches correspond to address lines A5–A8 of the computer bus (see infra) and are used to set an address between 200 hex and 3E0 hex, in increments of 20 hex.

1. Hardware

Referring now to FIG. 1, the hardware portion (card) 100 of one embodiment of the present invention is schematically represented by the block diagram. The hardware portion is further described in connection with FIGS. 11–13 below.

The Bi-Directional Transceiver circuitry 110 either permits data lines D0 through D7 112 to flow from the computer data bus 114, or allows data from the hardware portion 100 onto the computer bus 114.

The Control Signals & Address Latches circuitry 116 consist of data buffers, address latches, and address decoders (not shown). The circuitry 116 monitors the address lines A5 through A9 118 to generate the board enable signal (not shown). The circuitry 116 uses the control lines IOR, IOW, and AEN (not shown) to control the direction of data transfer on the bidirectional data lines 112 based on whether the transfer is a read or write.

The Arm, Disarm, & Refresh Control circuitry 120 receives data signals D0 through D3 122 to arm, disarm, or refresh the card 100. The purpose of the refresh signal is to stop the alarm of the board when the card 100 is in the armed mode.

The Board Condition Signals circuitry 124 monitors three conditions of the board. The conditions monitored are low battery, mode of card armed or disarmed, and if there has been an alarm. This information is sent on data lines D4 through D7 126.

The Count Down Timer 128 circuitry will start counting down when the card 100 has been armed for an alarm. If the card 100 receives a refresh signal the count down timer 128 resets and starts the count over. If the card 100 does not receive a refresh signal the count down timer 128 will time out and send a signal to the Alarm Control 130 circuitry.

The Alarm Control circuitry 130 will send an alarm signal when the card 100 goes into alarm.

The Relay & Buzzer Control circuitry 132 controls the Buzzer 134 when there is an alarm, or if power is removed when the card 100 is in the armed mode.

The Buzzer 134 sounds an audible sound during an alarm.

The Buzzer Timer circuitry 136 controls the length of time the buzzer will be audible.

The Battery Monitor circuitry 138 monitors the battery level indicating a good or bad level.

The Battery 140 supplies power to selected circuitry when power is removed.

The Battery Charger circuitry 142 will charge the rechargeable battery 140.

The 0.686 Hz Oscillator 144 supplies timing for the card 100.

Figure 11A:
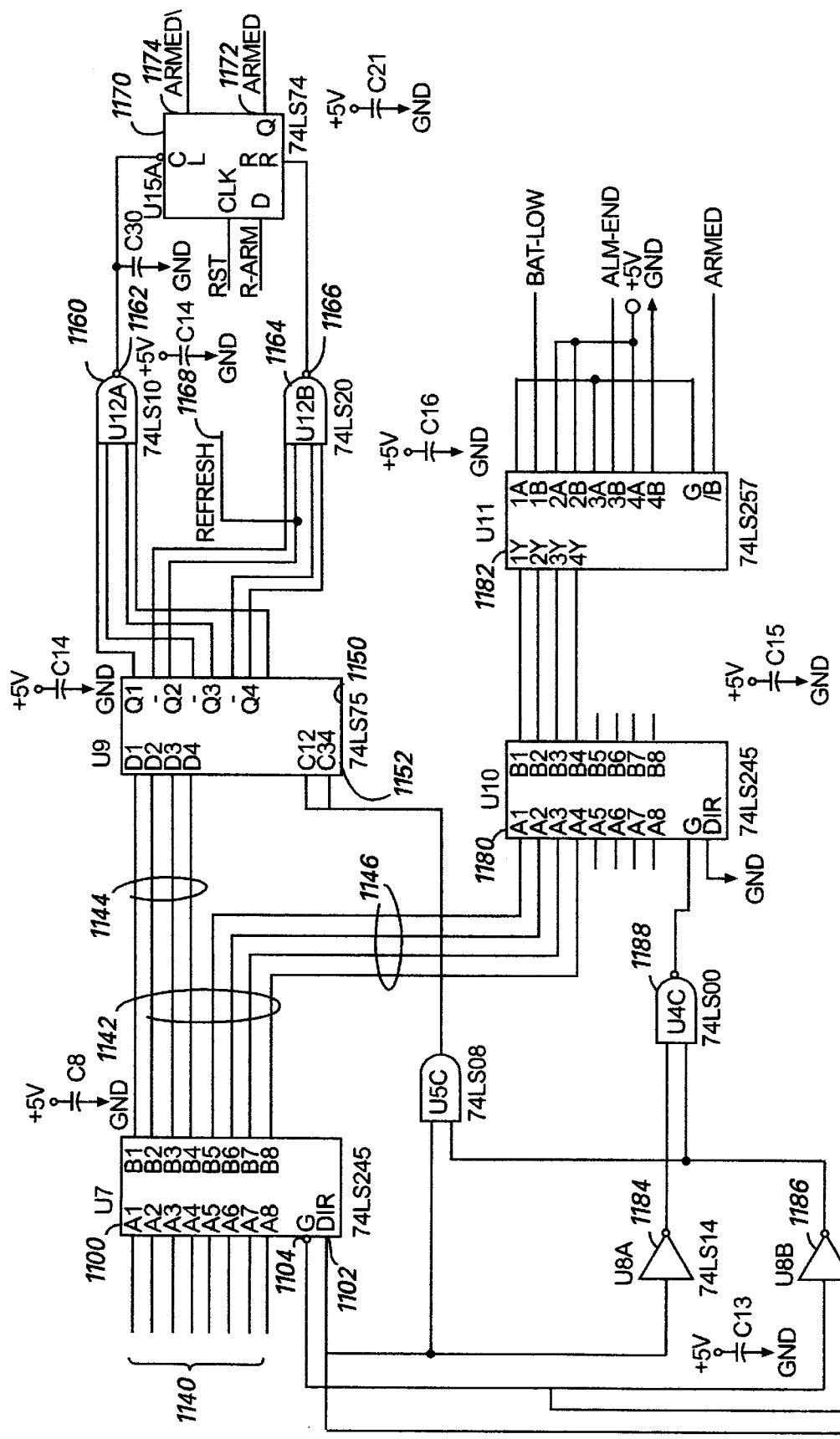
FIG. 11 shows a schematic of a portion of a hardware portion of the present invention.
Figure 11B:
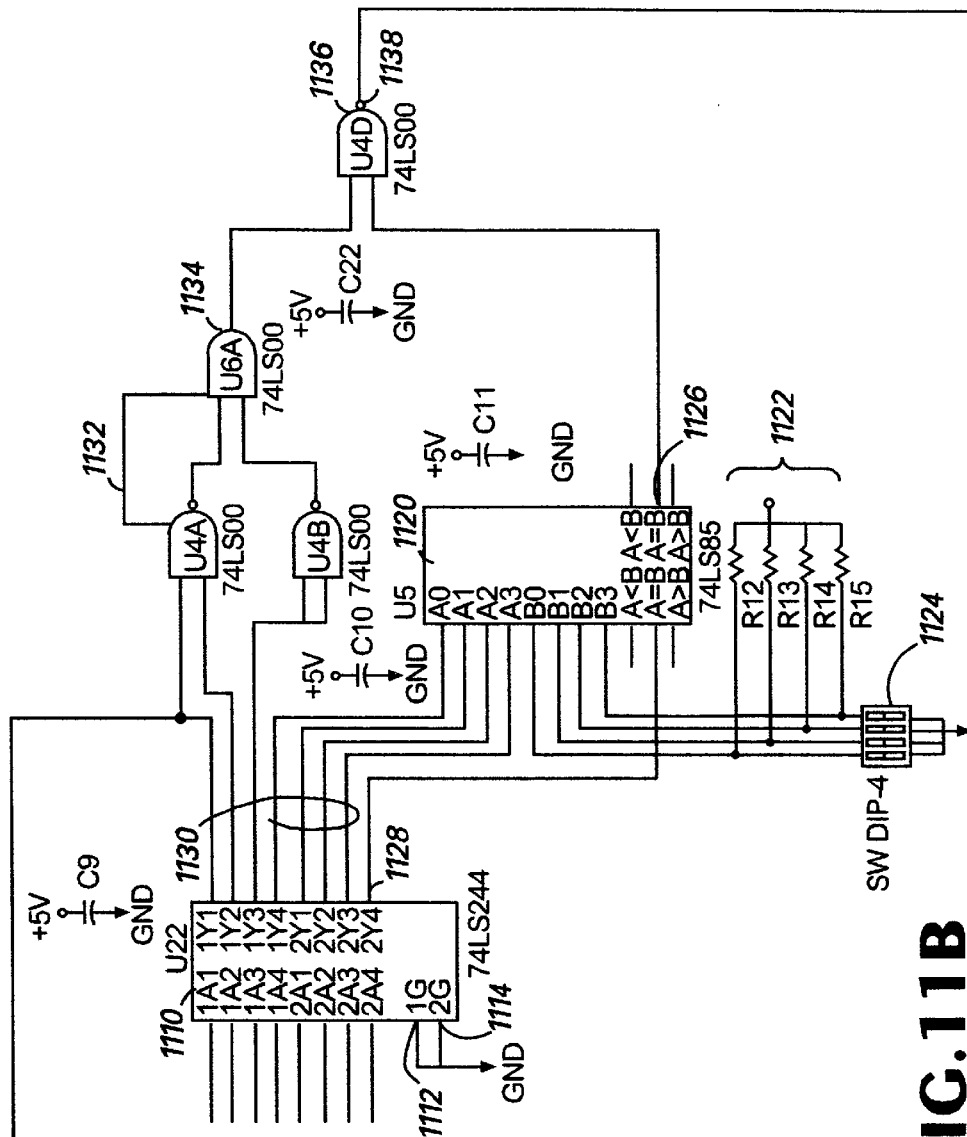
Figure 12:
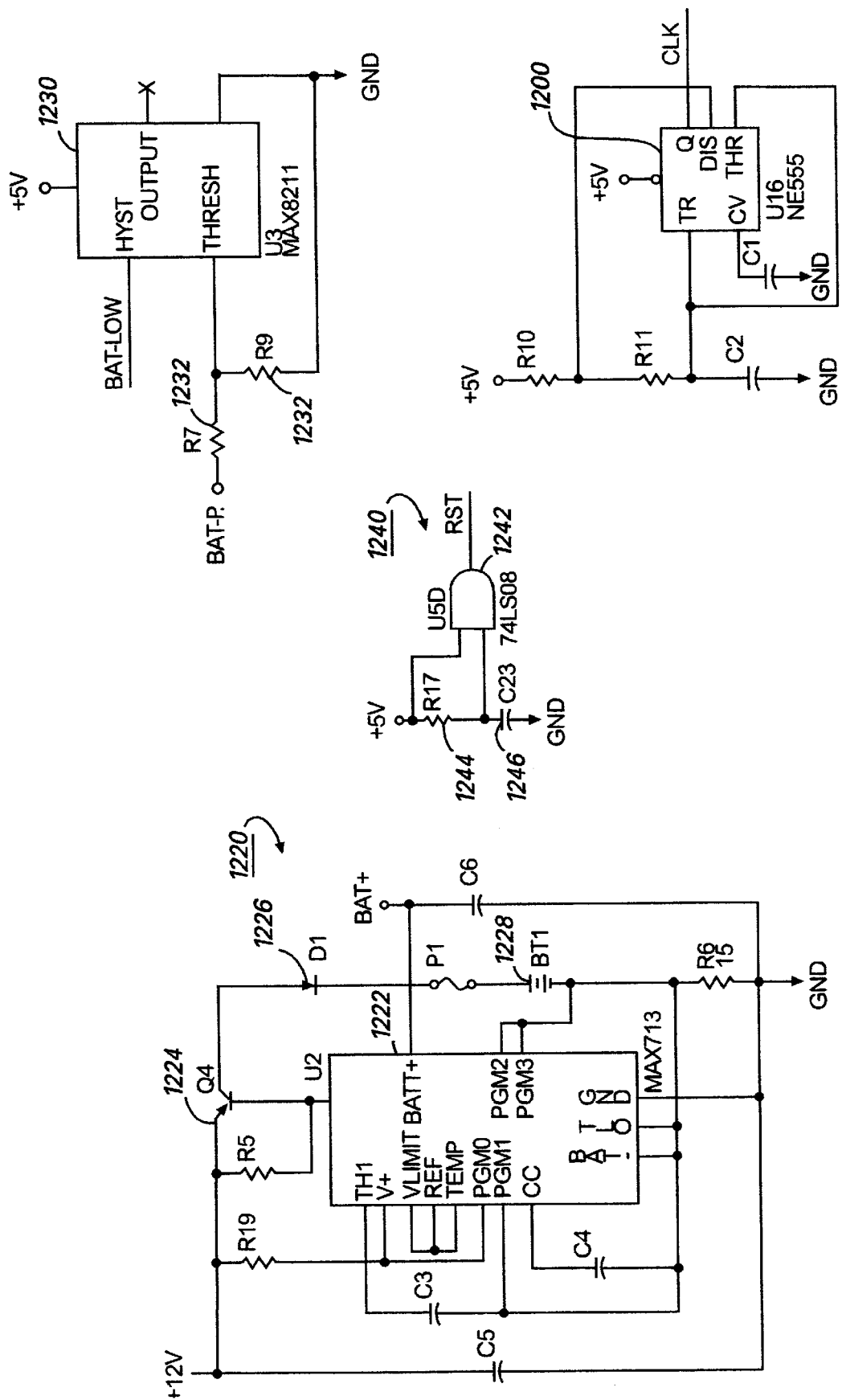
FIG. 12 shows a schematic of a portion of a hardware portion of the present invention.
Figure 13:
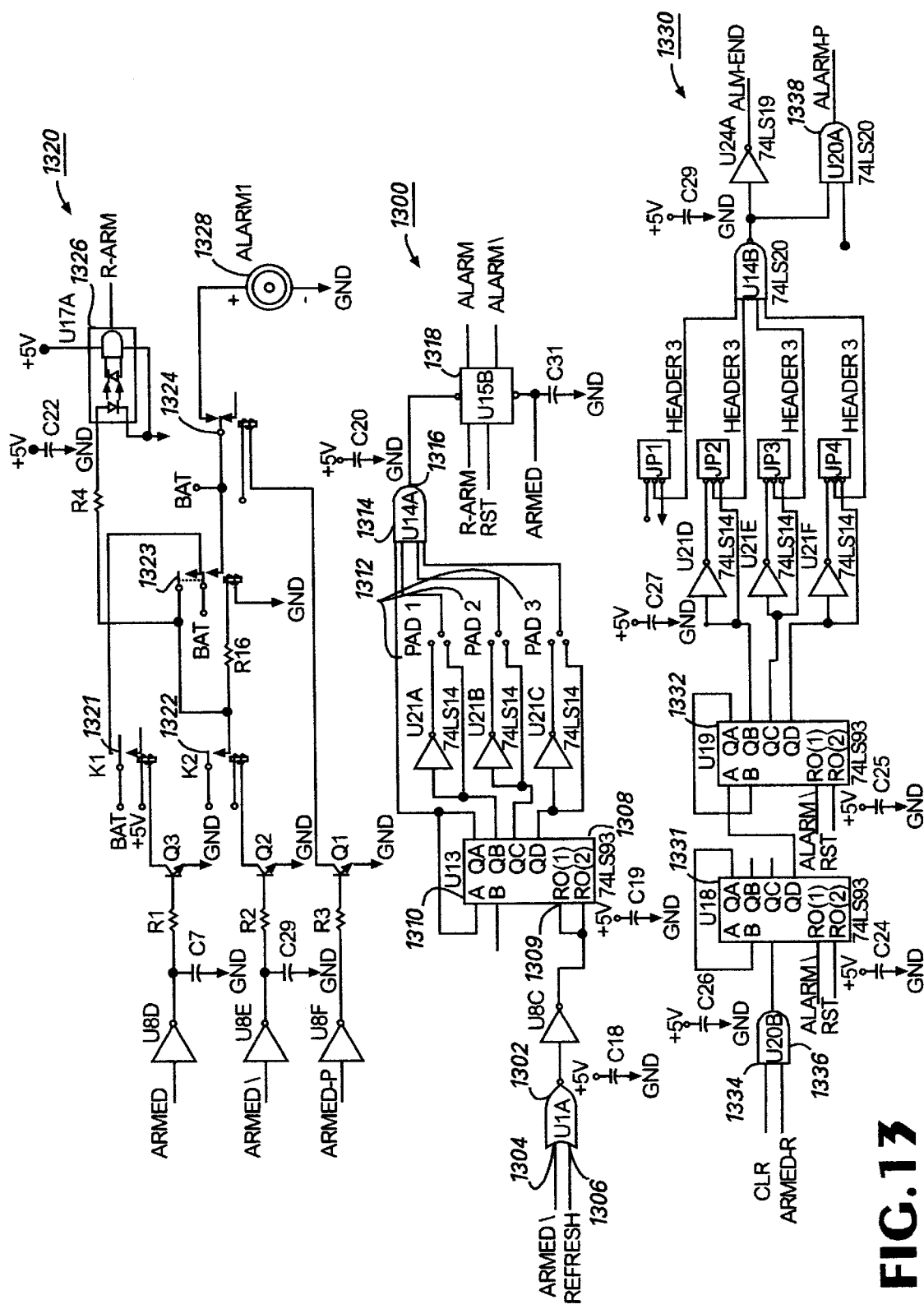
FIG. 13 shows a schematic of a portion of a hardware portion of the present invention.

Referring now to FIGS. 11–13, a schematic overview of the system is shown.

U7, a 74LS245, 1100 is the bidirectional 8 bit octal bus transmitter/receiver designed for 8-line asynchronous 2-way data communication between data buses. It operates in a three state mode. It can permit data to flow from the computer data bus, or allow data from the card onto the computer bus. The direction of the data flow is determined by the DIR pin 1102 of U7 1100. Timing of flow is controlled by the G pin 1104 of U7 1100. The enable input on the G pin 1104 of U7 1100 is used to isolate the buses. U7, the 74LS245, 1100 is a buffer between the computer data bus lines D0 through D7 1140 and the board data bus lines 1142 D0-1 through D7-1.

U22, a 74LS244, 1110 is a byte wide line driver whose enable pins 1G 1112 and 2G 1114 are tied to ground. Since the enable signal is active low, U22 1110 will always pass the bus signals, they buffer straight through.

The function of U5, the 74LS85, 1120 is to compare the levels arriving from U22 1110 with the inputs that come from the resistor bank 1122 R12 through R15 and DIP switch SI 1124, and output a high signal on pin 6 1126 when they are equal. Address bit A9 1128 is used as an enable gate to U5 1120 and must be high to permit further arbitration. Address lines A8–A5 1130 are compared with the inputs that come from the resistor bank 1122 R12 through R15 and DIP switch S1 1124. The range of address settings are Hex 200-3FF.

U4A, U4B, and U6A is a logic circuit 1132 which compares AEN-1 (Address Enable) with IOR-1 (Read) or IOW-1 (Write). Pin 3 1134 of U6A will output a high signal when AEN-1 goes low and IOR-1 or IOW-1 goes low, indicating a read or write command plus an address enable has been initiated on the bus.

U4D 1136 gate pin 11 1138 will go low if the board has been addressed and AEN (Address Enable) IOW (I/O Write) or IOR (I/O Read) have been initiated on the bus.

The board data lines 1142 D0-1 through D7-1 are split into two groups. The first group 1144 D0-1 through D3-1 data lines are used for receive data and the second group 1146 D4-1 through D7-1 data lines are used for transmit data.

U9, The 74LS75, 4-bit bistable latch 1150 is used as temporary storage for binary information. Information that is present at a data (D) input is transferred to the Q output when the enable (C) 1152 is high and the Q output will follow the data input as long as the enable (C) 1152 remains high. When the enable (C) 1152 goes low, the information that was present at the data input (D) at the time the transition occurred is retained at the Q output until the enable (C) 1152 is permitted to go high.

Three commands ARM, DISARM, and REFRESH can be received by the board. U12A 1160 will detect the DISARM (hex 5) command from the data bus signals D0 through D3 and U12A 1160 (pin 6) 1162 will go low. U12B 1164 will detect the ARM (hex A) command from the data bus signals D0 through D3 and U12B 1164 (pin 8) 1166 will go low. The REFRESH command will alternate between hex 0 and hex 2 from the data bus signals D0 through D3. The REFRESH signal will be at U12B 1164 (pin 10) 1168.

U16, The NE555 timer 1200 (FIG. 12) is the clock circuit operating at 0.686 Hz (1.458 Sec.). This circuit supplies timing on the board.

U15A, The 74LS74 Flip Flop 1170 will follow the ARM or DISARM command sent from the computer data bus lines D0 through D3. When the board receives an ARM command U15A 1170 (pin 5 1172) goes high and (pin 6 1174) goes low. When the board receives a DISARM command U15A 1170 (pin 6 1174) goes high and (pin 5 1172) goes low.

Integrated circuits U1A, U8C, U13, U21A, U21B, U21C, and U14A, make up a count down circuit 1300 (FIG. 13). The count down circuit 1300 is always disabled when the ARMED\ signal is high on U1 1302 (pin 2 1304). When the ARMED\ signal on U1 1302 (pin 2 1304) goes low and the REFRESH signal on U1 1302 (pin 3 1306) is low the board is in the armed mode of operation. During the armed mode, the counter (U13 1308) will start to count the CLK (clock 1310) signal for a predetermined amount of time configured by PAD1 through PAD3 1312. If no REFRESH signal on U1A 1302 (pin 3 1306) is received the counter will continue to count until TOUT\ signal on U14A 1314 (pin 6 1316) goes low indicating an alarm condition. To prevent an alarm condition the circuit must receive a low to high REFRESH signal on UIA 1302 (pin 3 1306). The REFRESH signal is used to reset the counter U13 1308 (pins 2 and 3 1309) preventing it from timing out, and keeping the board in the armed mode of operation. U15B 1318 flip flop gets set by the TOUT\ signal for the alarm condition. U15B 1318 flip flop gets reset by the ARMED signal for the armed condition.

The relay and alarm buzzer circuit 1320 is made up of U8D, U8E, U8F, Q1–Q3, K1–K4, U17A, and ALARM1. The primary purpose of this circuit is to sound an alarm if the power is turned off when the board is armed. There are three inputs to this circuit, ARMED, ARMED\, and ALARM-R. When the board is in the disarmed mode relays K1 1321 and K4 1324 will be energized, while relays K2 1322 and K3 1323 will be de-energized. When the board is in the armed mode relay K1 1321 will be de-energized, while relays K2, K3, and K4 (1322, 1323, and 1324) will be energized.

During the armed and disarmed mode the ALARM1 will not sound. The opto coupler (U17A 1326), monitors the mode of K1 1321, K2 1322, and K3 1323 and outputs a high signal (R-ARM) when in the armed mode. If power is removed from the board during the armed mode, relay K3 1323 will remain energized from battery power through contacts 8 and 1 of relay K1 1321, relay K4 1324 will de-energize causing ALARM1 1328 to buzz. If power is returned to the board, R-ARM signal will cause the board circuitry to return to the armed or disarmed mode of operation, depending on the mode at time of power removal. If the board is in armed mode and input signal ALARM-R goes high indicating an alarm, relay K4 1324 will de-energize causing ALARM1 1328 to buzz.

The audible alarm time-out circuit 1330 consist of U20B, U18, U19, U21D, U21E, U21F, U14B, U24A, U20A and JP1-4. The purpose of this circuit is to send a control signal (ALARM-R) to set the amount of time for the audible alarm to sound, and to send a signal (ALM-END) that the board has had an alarm. In one embodiment, the circuit can be jumper configured from 47 seconds to infinite. This circuit consist of two divide by sixteen counters U18 1331, U19 1332, and associated gates and jumpers. When the ALARM\ signal goes low the counters will start the time-out sequence until the ALARM-R signal goes low stopping the CLK signal 1334 at gate U20B 1336. The ALARM-R signal is controlled by the time-out of the counts and the ALARM signal through U20A 1338.

Monitoring the conditions of the board from the bus is accomplished with circuits U7 1100, U10 1180, U11 1182, U8A 1184, U8B 1186, and U4C 1188. Three signals are read from the board to the bus, BAT-LOW (battery low), ALM-END (alarm end), and ARMED (armed mode). U11 1182 will multiplex the conditions of the board to data lines D4-2 through D7-2. The multiplexing of U11 1182 is controlled by the ARMED signal. U10 1180 an octal bus transceiver will transfer the data signals to data lines D4-1 through D7-1 1146 during a read operation. The read operation is controlled by gates U8A 1184, U8B 1186, and U4C 1188. U7 1100 an octal bus transceiver will transfer the data signals to data lines D4 through D7 on the computer bus during a read operation. The codes for the conditions of the board are as follows:

Armed 0011 (hex 3)
Battery Low 0010 (hex 2)
Previously Alarmed 0111 (hex 7)
Disarmed 1010 (hex A)

The battery charging circuit 1220 is made up of U2 1222, Q4 1224, D1 1226 and associated components. U2 1222 (MAX713) is a fast charge controller for the nickel cadmium battery (BT1) 1228.

The battery level detector circuit consists of U3 1230 (MAX821 1) and associated components. The MAX8211 1230 is a CMOS micropower voltage detector. It contains a comparator, a 1.15 V bandgap reference, and an open drain N-channel output driver. Two external resistors 1232 are used in conjunction with the internal reference to set the trip voltage to the desired level.

The power up reset circuit 1240 consist of U6D 1242, R17 1244 and C23 1246. This circuit will initialize the logic circuits to the proper state during power up sequence.

2. Overview of Hardware/Software Interaction

Figure 2:
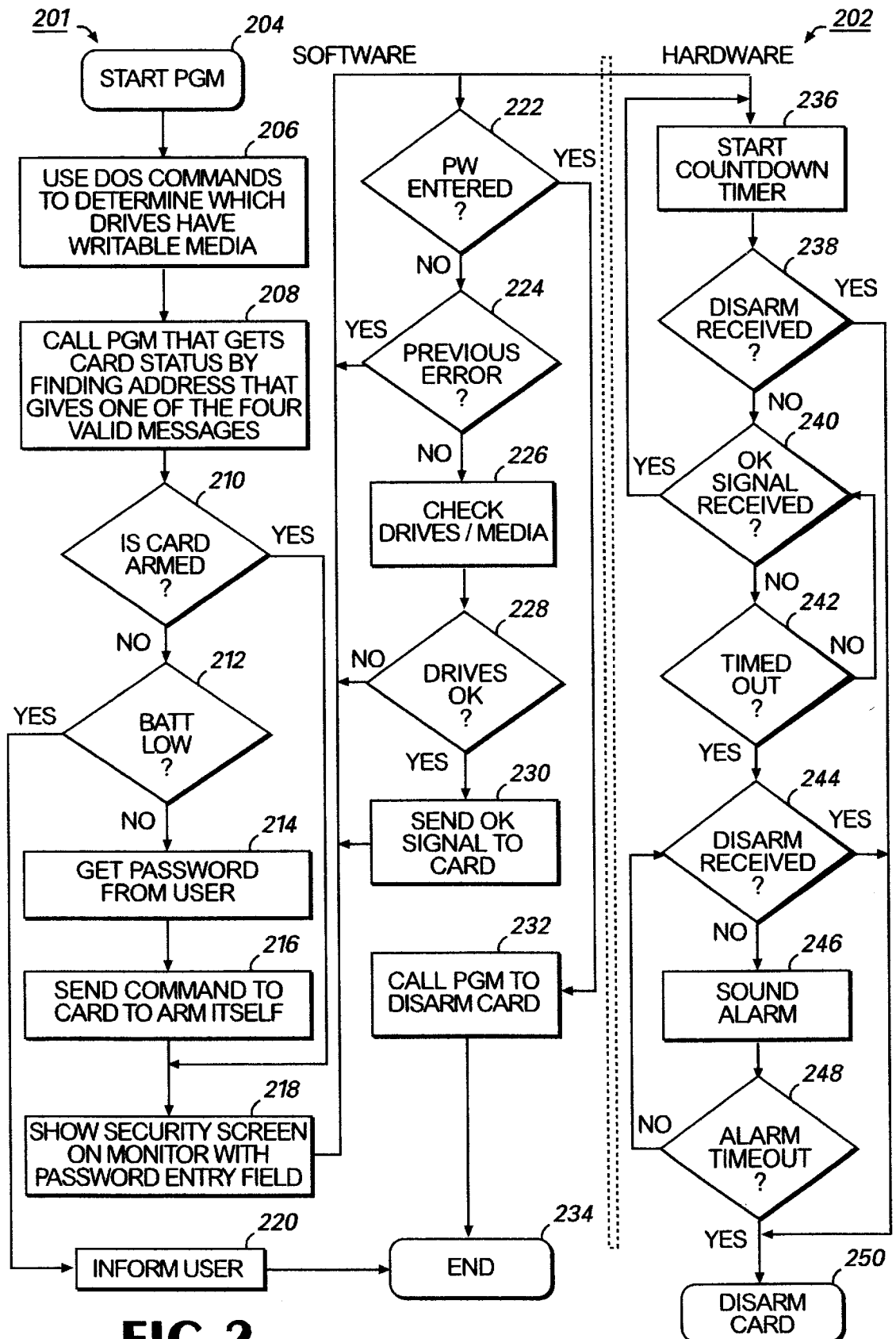
FIG. 2 shows an overview flowchart of the system of the present invention.

Referring now to FIG. 2, an overview flowchart is shown depicting how the software 201 and hardware 202 interact in the system of the present invention. The two columns on the left hand side of the Figure describe the software 201 actions. The column on the right hand side of the Figure describes the hardware 202 actions that occur when the software 201 sends a command to the hardware 202.

The software 201 first checks to see which drives have writable media 206. It then iteratively checks 208 address locations in steps of 20 Hex until it finds a valid message. If the message indicates that the card is already armed 210, the secure screen 218 is displayed immediately and the software 201 and hardware 202 enter their respective cycles. If the battery is too low 212, the user is informed 220, the card is disarmed (not shown) and the program ends 234. If the card is not already armed, the user is prompted 214 to enter a password before the secure mode 218 is started. If a valid password is entered 214, then the card is armed 216 before entering secure mode 218.

Once the secure mode 218 is started the software cyclically checks for security breaches. As long as there is no detected security breach, the software periodically sends an "OK" message (also called a "refresh" signal herein) to the card 230. In particular, if the system first determines whether the disarming password has been entered 222. If so, the card is disarmed 232 and the software 201 is terminated 234. Otherwise, the system determines whether there was a previous error condition 224. If so, the main loop is continued while the hardware countdown operates. If not, then the writable media are checked 226. If the writeable media do not indicate tampering 228, then a refresh or "OK" signal 230 is sent to the alarm card. Once the a breach has been detected, the refresh signal is no longer sent.

Once the secure mode is started the hardware 202 starts monitoring an internal countdown timer 236. Every time the software sends an OK or refresh signal and the signal is received 238, the timer is restarted 236. If the timer ever counts down to zero 242, an alarm 246 is sounded. This alarm sounds until it times out 248 or until a disarm command 244 is received. At any point in the process that a disarm command is received 238 or 244, the card is disarmed 250 and the card waits for further input from the software 201.

3. Arming the System

To deny an intruder access to classified or sensitive information during the unattended operation of the PC, the keyboard and mouse are prevented from communicating with the PC. The PC's removable media are protected against theft and tampering. The monitor is protected from observation by passers-by.

After the user runs the security program, the program writes a file to a directory of all writable media in the drives that are monitored. In one embodiment, the file is named SECFILE.DAT and is placed in the root directly of each writable media. One of ordinary skill in the art would, however, appreciate that other filenames, paths, and writable media could be readily configured to operate within the parameters of the present system. To move from box to box on a screen, the user can TAB to the next box, enter the required information, and then press ENTER; or the user can click on the box. If the user does not TAB to the boxes, but does press ENTER, the program will automatically default to CANCEL. By using this default, the operator does not accidentally issue an unintended command.

A Password Entry Screen is then shown. In one embodiment, the user must enter the password two times to verify correct entry. In a further embodiment, the password is case-sensitive. The user then presses the Continue button to advance to the next screen. If the two passwords do not agree or are not 5 characters long, an information box appears and the password entry screen remains on display. When entering the password, the user does not have to hit the ENTER key. The user may, however, have to wait a few seconds for the program to respond. Entering the passwords and pressing Continue will cause a further screen to be displayed informing the user which drives will be monitored. This screen also allows the user a second opportunity to exit the program.

To secure the computer, the user clicks on the Continue button. Selecting Continue closes the screen listing drives to be monitored, stores a list of the drives to be monitored and writes the previously described file titled in a directory of all writable media in the drives that are to be monitored. The software next opens the Security Screen and initiates the monitoring process. At this point any tampering with the selected drives or media causes an alarm. Also, interrupting the program or the power to the computer causes an alarm to sound. The alarm is generated on the one-slot alarm card residing in the computer. The alarm card has battery backup and senses power interruptions.

4. Disarming the System

When the user wishes to disarm the system, the user enters the disarming password. In one embodiment, the disarming password must be identical to the arming password. Valid password entry stops the security program. Pressing ENTER is not necessary. It may be necessary to wait a few seconds for the program to halt, depending on what part of the monitoring cycle the program is executing.

If the password is entered incorrectly, the user may correct it using the mouse or Arrow keys and the Delete key and may attempt to reenter the password. The program only accepts four password entries or a total of 20 characters. After that the program goes into alarm, and the user must wait for the time-out period set at installation time to expire. Thus, if the first one or two password entries are unsuccessful, the user should make sure that Caps Lock is not on and the user has not been using the wrong password.

5. Alarms

As discussed infra, in one embodiment, the following conditions cause an alarm: 1) tampering with (opening or removing) a drive that is being monitored; 2) trying too many passwords (or typing too many characters); 3) interrupting the program (i.e., CTRL-ALT-DEL); and 4) interrupting the power.

In a further embodiment, a silent or remote alarm could be used rather than an audible alarm or speaker. Such a system could signal security personnel at a remote location, for example, via a wireless link.

In yet a further embodiment, the program could check for the presence of writable media in drives that did not contain writable media when the program was started. For instance, an intruder may try to insert a diskette into an empty drive on the PC to install malicious code. If the diskette is not noticed before access to the drive is attempted, the initial access to the diskette may transfer the malicious code to the PC. Therefore, it is a further feature of the invention that, in one embodiment, prior to disarming the PC, the system can display to the user a screen which repeats the listing of the armed drives and reminds the user to physically inspect all external drives for unauthorized diskettes. When the user has inspected the drives, the users indicates whether inspection is finished and the system of the invention only then disarms.

6. Stopping Alarms

If a drive tamper initiated the alarm, then entering the correct password will stop the alarm, as well as halt the program after an appropriate minimum alarm time. Also, if the program was only suspended using CTRL-ALT-DEL and can be re-entered by pressing ENTER or ESC, then correct password entry can still halt the alarm and the program.

If, however, too many passwords were entered, or the power was interrupted, the user must wait for the time-out period which was set at installation time to expire. Note, however, that if the installer selected the time-out to be infinite, then the only way to stop the alarm at this point would be to remove power and wait for the battery to run down or to remove the battery from the alarm card (or physically deactivating the speaker). After the time-out has expired, the user can reenter the program and enter the correct password to disarm the alarm card. If, instead, the user turns off the computer, the alarm will sound again. If the computer is then turned back on, the time-out period will begin again. The alarm card will always be armed until the user enters the program and disarms it.

7. Operation of the Present Invention

Figure 3:
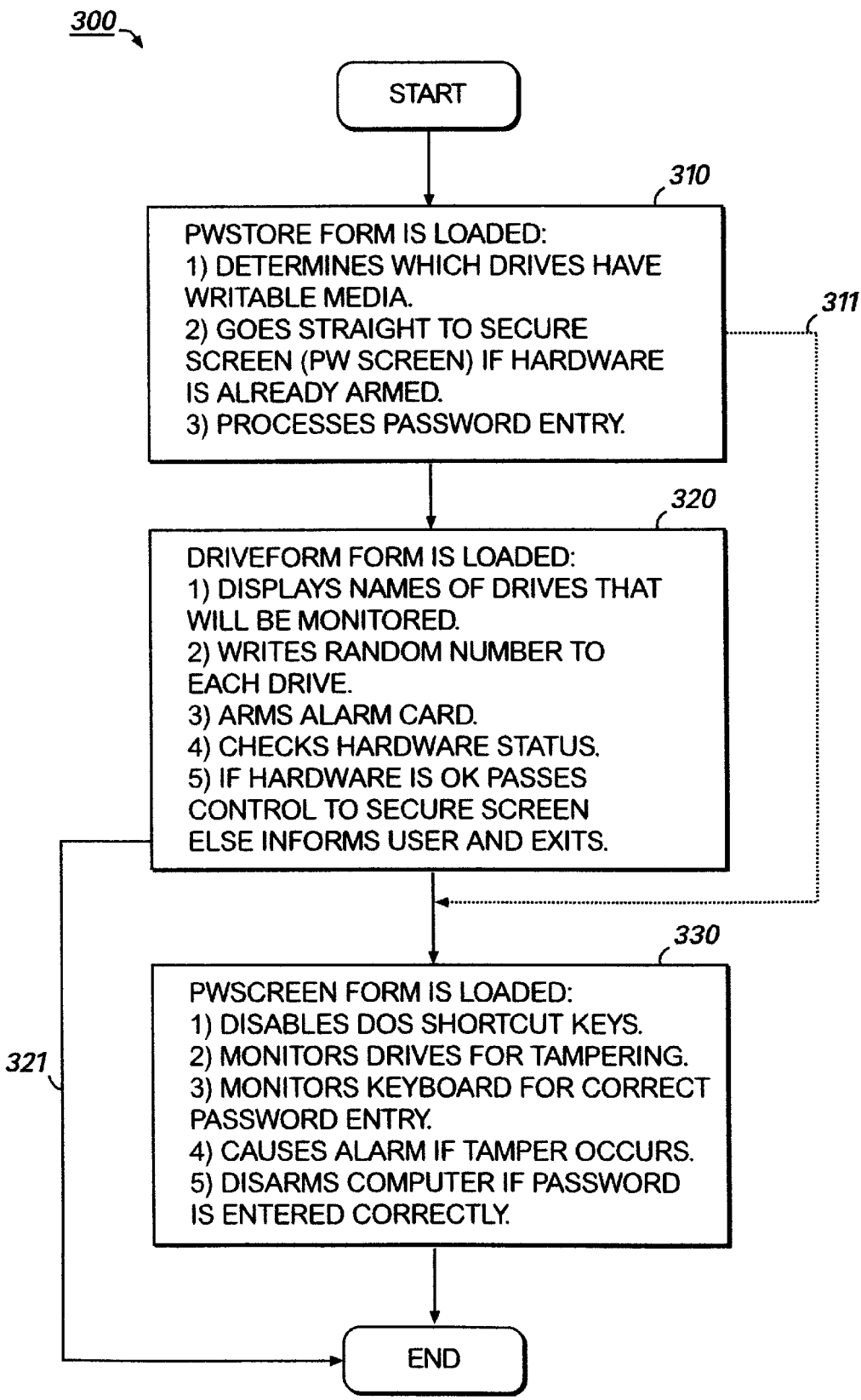
FIG. 3 shows a flowchart of the system of the present invention.

Referring now to FIG. 3, the flow chart provides an overall perspective of the software portion 300 of the present invention. There are three screens (also referred to as "forms") 310, 320, and 330 that are loaded one at a time. The first form 310 (PWStore) determines which drives should be monitored and processes password entries. In addition, if the computer was previously armed and not disarmed, the first form 310 will detect this even and, instead, pass control 311 directly to the security screen 330. Thus, the original password will be required. The second screen 320 (DriveForm) shows the drives that will be monitored and allows the user to exit the program. If the user chooses to continue then a small file is written to each writable media and the card is armed. If these operations are successful, then control is passed to the secure screen 330, if not the user is informed of the problem (bad drive, low battery, etc.) and the program ends (via 321) after disarming the card. The third screen 330 covers or occludes the part of or the entire monitor screen (hiding any information that is processing) (not shown) and disables all shortcut keys except CTRL-ALT-DEL. Thus, no computer commands can be entered that would disarm the alarm card. While the secure screen 330 is shown, the program is constantly checking each drive for the correct random number and sending a signal to the alarm card. If the program fails to read the correct random number, or if several wrong passwords are entered the program stops sending the signal to the card and, if the alarm card fails to receive a signal for a specified amount of time, the card starts alarming. However, if the correct password is entered the card is disarmed and the program ends.

Figure 4:
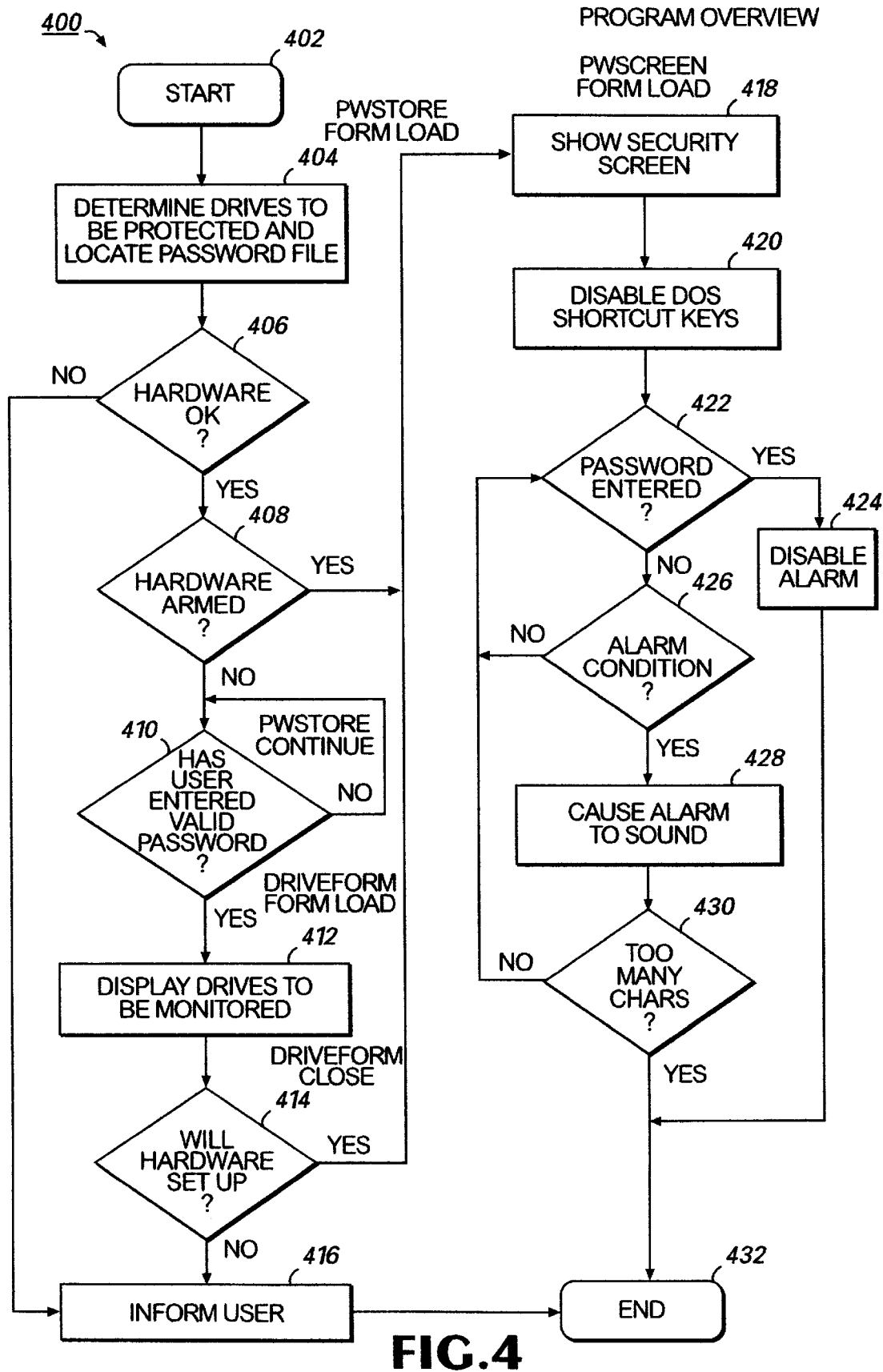
FIG. 4 shows a flowchart of the system of the present invention.

Referring now to FIG. 4, a flow chart provides a further depiction of the operation of the software portion 400 of the present invention. The details of the password entry, secure screen and driveform forms are set forth below. However, as shown in FIG. 4, after the program is started 402, the program determines 404 which drives are to be protected by calling the PWStoreForm_Load form. If the hardware is, for some reason, not operational 406, then the user is informed 416 and the program is terminated 432. Otherwise, the system 400 determines whether the hardware has already been armed 408. If so, control is passed directly to the security screen 418 (PWScreenForm_Load). Otherwise, the system 400 determines whether a valid password 410 has been entered by the user. This step is repeated until a valid password is entered.

Once a valid password 410 has been entered, a form 412 is shown depicting the various writable media to be monitored and then the hardware portion of the security system is requested 414 to be set up. If the hardware portion cannot be set up 414, then the user is informed 416 and the program is terminated 432. Otherwise, control is passed to the security screen module 418.

During the security screen 418 operation, keyboard shortcut keys are disabled 420 and the input devices are blocked. The system continuously determines whether the correct password 422 has been entered. If so the alarm is disabled 424 and the program ends 432. Otherwise, the system 400 determines whether an alarm should be sounded because of a breach in the system or other predefined condition. If so, the alarm is sounded 428. Finally, if the alarm has sounded, the system queries 430 whether too many characters have been entered. If not, the program returns control to the password entry screen 422 for input of further characters. Otherwise, the program terminates 432 with the alarm still sounding (depending upon the alarm time out duration).

Figure 5:
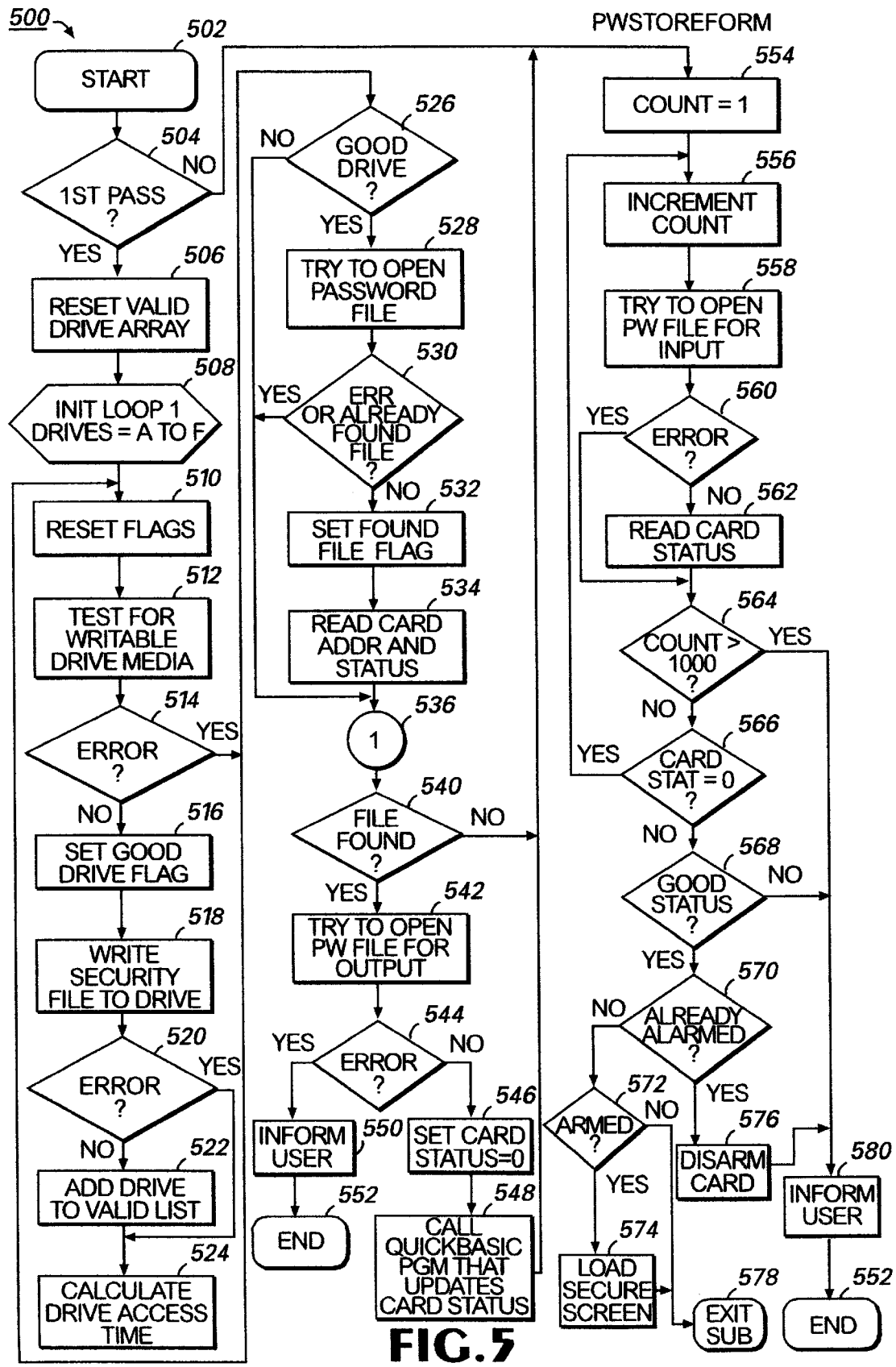
FIG. 5 shows a flowchart of the system of the present invention.
Figure 8:
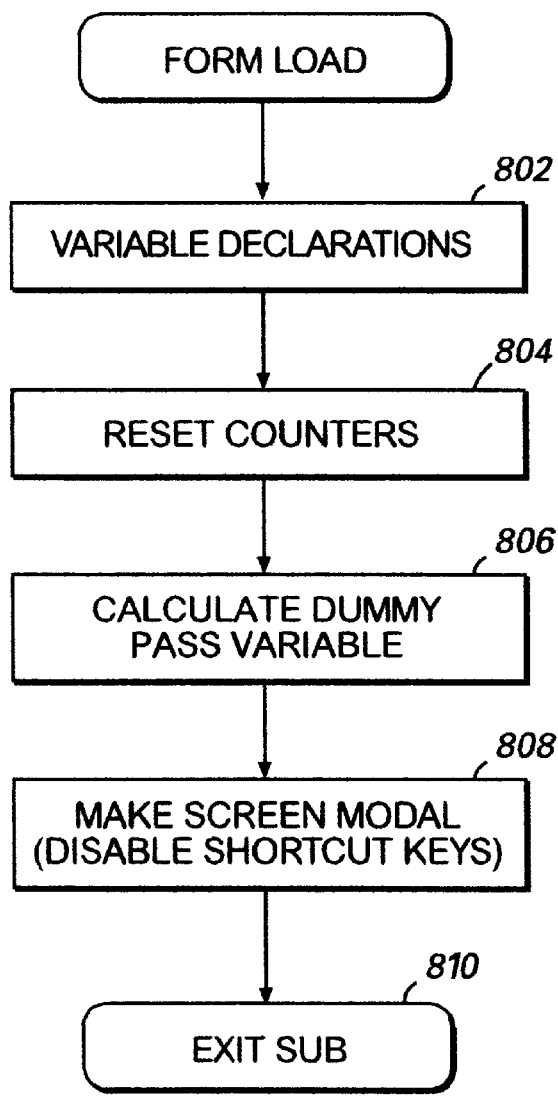
FIG. 8 shows a flowchart of the system of the present invention.
Figure 9:
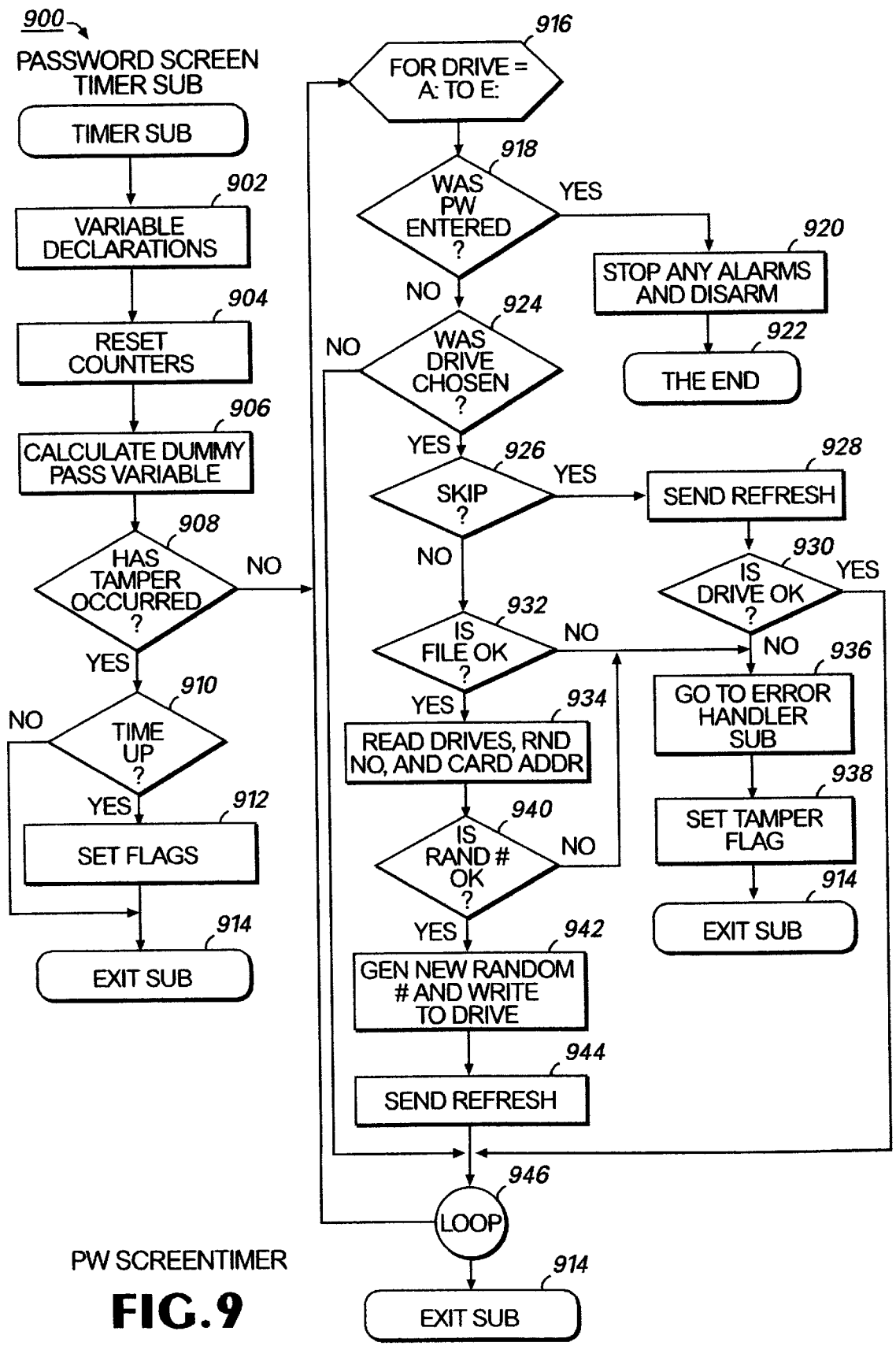
FIG. 9 shows a flowchart of the system of the present invention.
Figure 10:
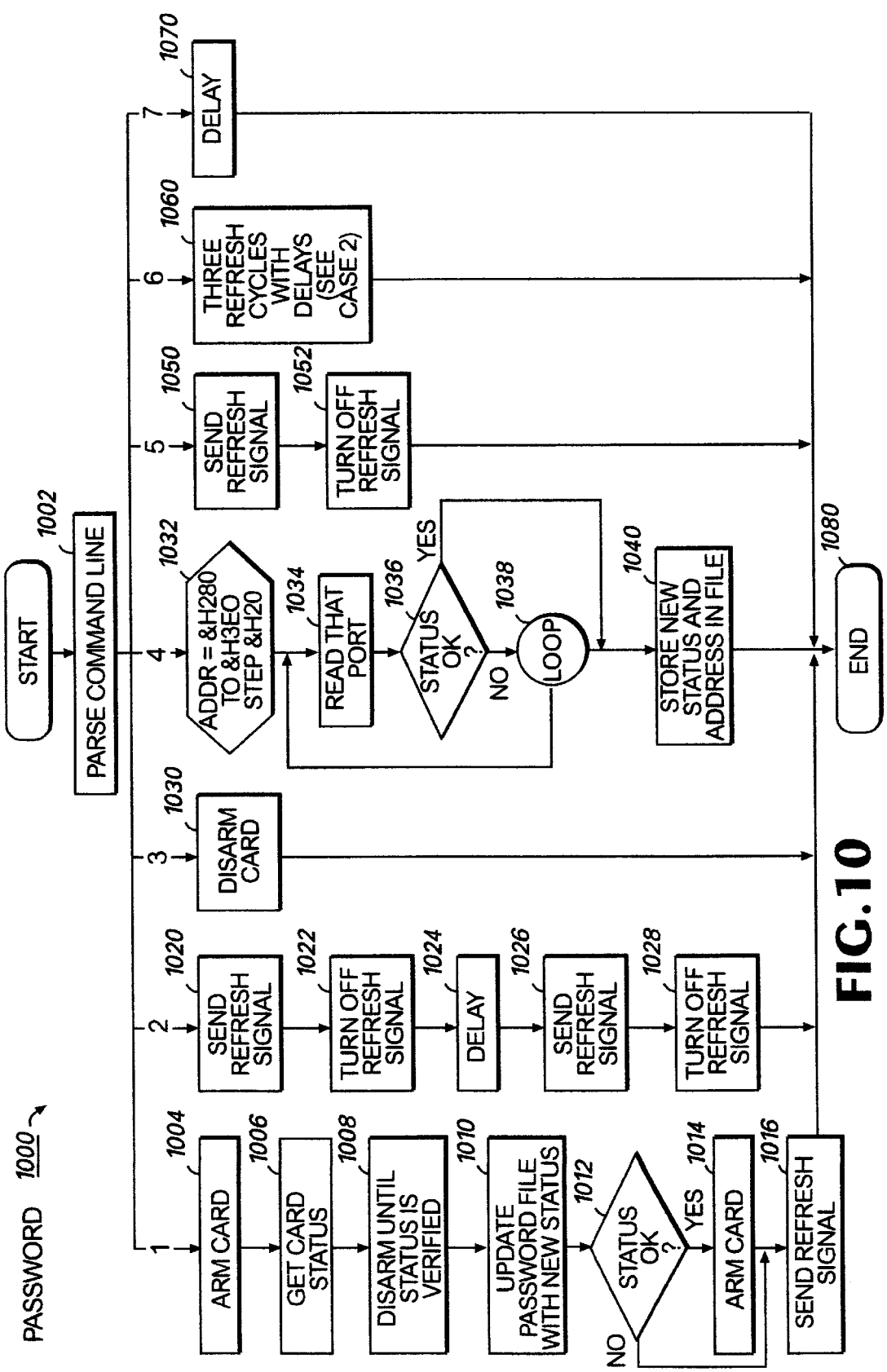
FIG. 10 shows a flowchart of the hardware portion of the system of one embodiment of the present invention.

FIGS. 5–10 are more detailed flowcharts of various portions of one embodiment of the present invention. FIG. 5 depicts the "PWStore Form_Load" 500, otherwise referred to as the password entry screen (See FIG. 3, 310 and FIG. 4, 404). "PWScreen Form_Load" 500 shows the initial operations of the secure screen 310. "PWStoreContinue_Click" 600 shows the password processing operations. "DriveFormClose_Click" 700 shows several hardware checks and error handling. "Timerl_Timer" 900 shows the heart of the security system that cyclically checks for tampering and keeps the alarm card from alarming if no tampers have occurred. FIG. 10 shows a flow diagram of the module 1000 that directly interfaces with the hardware.

In a preferred embodiment, it is desirable that the commands issued by the software to the hardware be executed immediately, rather than queued for later execution. Because of this problem, the sections of the program immediately following calls directed to the hardware have been structured to use loops containing a "DoEvents" command. The DoEvents command causes the Windows operating system to flush all pending events before returning control to the security system. In order to determine when the command has been executed, the software rewrites the password file showing a card status of 0, then the software program updates the password file with the current card status. This passing of the card status via the password file lets the software program know when the module communicating with the hardware has completed execution. One of ordinary skill in the art would recognize that this program could be rewritten in a language that provided a user interface and direct hardware addressing.

a. PWStore

Referring now to FIG. 5, there are several operations that are only performed the first time 504 PWStore_Form 500 executes. The main purpose of this section of code is to determine which drives should be monitored. This is accomplished by resetting a list 506 of potentially valid writable media and then trying to retrieve directory information from a given directory of each writable media 508. For each possible valid writable media, a flag is reset 510 and the drive is tested for writable media as described 512. If this is successful, then the drive is flagged as good 516 and an attempt is made to open a file 518 for output on that drive. If the file open is successful 520, then the program attempts to write the default values of a password file to that directory. If all of these operations are successful, that drive is added to the list of drives to be monitored 522. If any of these operations are not successful then that drive is ignored. If a drive is added to the list, then a calculation is made 524 and stored in an array indicating the number of seconds required to access that drive. This information is used in setting the refresh time of the alarm card (see infra).

Next, the program determines whether the drive is a valid drive 526. If the drive is not valid, control is passed directly to 536. Otherwise, the system attempts to open the password file 528. If there is an error or the file already exists, control is again passed directly to 536. Otherwise, a file found flag is set 532 and the card status is queried 534. Control then normally passes to subroutine 536.

After return from subroutine 536, the program checks whether an old password file can be found 540 on any of the drives. If there is an error 544 in opening the old password file, then the user is informed 550 and the program ends 552. If there was no error 544 in opening the old password file, then the card status byte is reset to zero 546. The hardware interface module 548 is then invoked with a command to find the address of the card and update its status. Then the program loops 554 while checking the small password file 556 and 558 to see if its status has been updated. If there is an error 560 in attempting to open the password file, then the software determines 564 whether a loop counter is above a predefined threshold (e.g., 1000) and, if so, the user is informed 580 and the program terminates 552. If the counter 564 is below the threshold, then the status of the card is compared to zero 566. If the status is zero, the loop is reentered and the count is incremented 556. Otherwise, the status is rechecked 568, and if the status is improper, then the user is informed 580 and the program terminated 552. However, if the status is proper, then the system determines whether the alarm has already sounded 570. If not, then the card is checked to determine whether it is already armed. If so, then the secure screen is loaded 574. Otherwise, the subroutine is exited and the program waits on the user to enter the desired password.

However, if the alarm had already sounded 570, then the card is disarmed 576, the user is informed 580, and the program is terminated 552.

Figure 6:
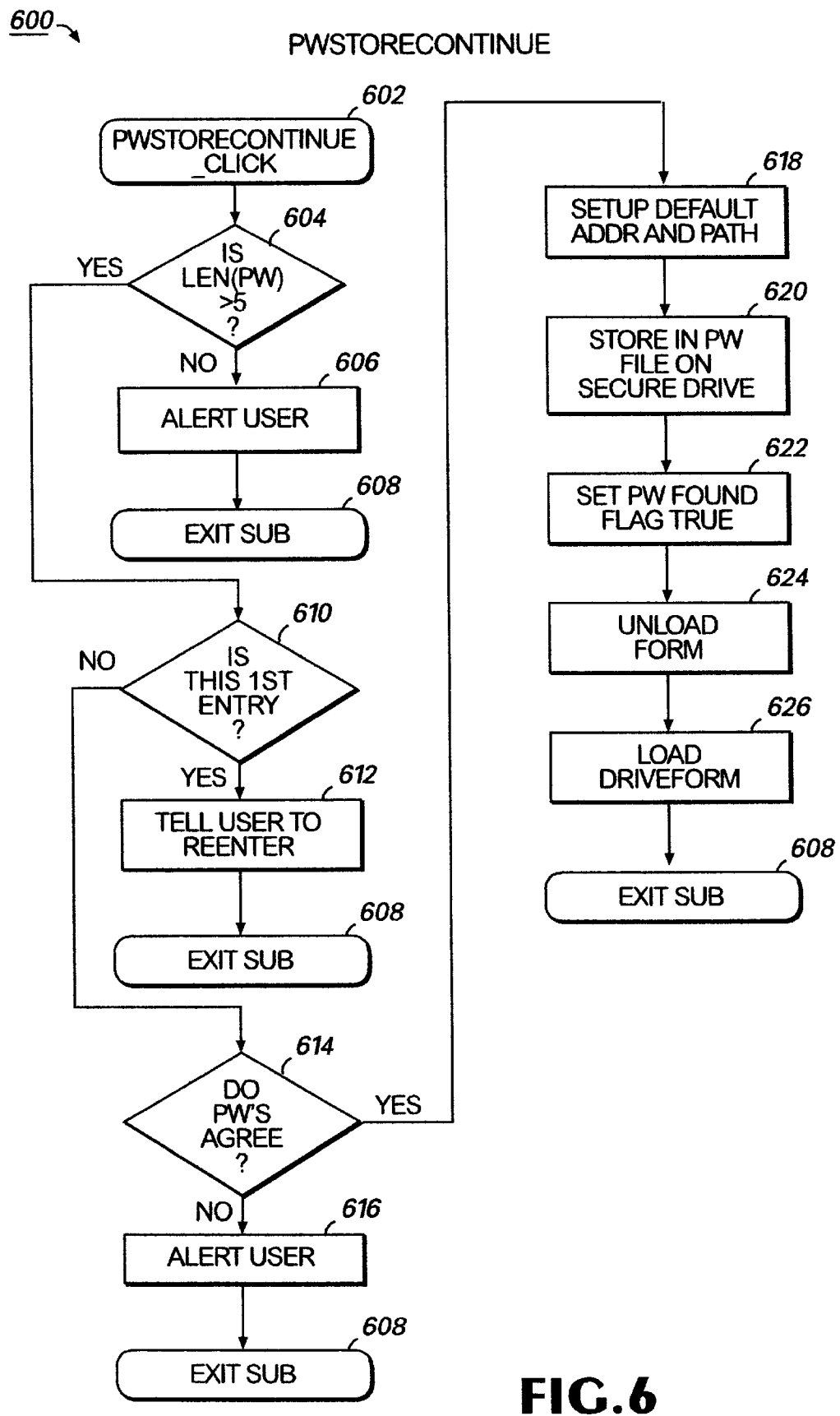
FIG. 6 shows a flowchart of the system of the present invention.

The remaining subroutine 536 (see FIG. 6), PWStoreContinue, processes the password entries. Referring to FIG. 6, the subroutine 600 responds to the user clicking the store button 602. The subroutine 600 first checks to see that at least 5 letters were entered 604. If not, then the user is alerted 606 and the subroutine is exited 608. Otherwise, the subroutine checks to see if this was the first password entered 610. If so, then the routine requests the user to reenter the password 612 and the subroutine is exited 608. If the entry was not the first entry, then the password is compared to the previously entered password 614. If the passwords do not agree, then the user is alerted 616 and the subroutine is exited 608.

One of ordinary skill in the art would recognize that other verification methods schemes could be used rather than using passwords,per se (see supra). For example, passwords would not be required if other identification/authentication technology is used, such as, but not limited to, face print technology, retinal scan, finger/handprint technology, finger/hand span technology, voice print, and signature dynamics.

For a system requiring passwords, if the two entered passwords match, then the default address and path are determined 618, the password file is created on the writable media to be secured 620, the password found flag is set 622, the password store form is unloaded 624 and the drive form 626 (see FIG. 3, 320) is loaded. The subroutine then exits 608 passing control to the appropriate form.

b. DriveForm

After the user has entered a valid password, a Form_Load subroutine (not shown) lists the letter designations of the various writable media to the screen. The Form_Load subroutine also provides for user cancellation of the program and for returning to the password screen, if desired. After the Form_Load subroutine has finished, the user clicks a button to close the form. Clicking this button 702 causes execution of the DriveFormClose subroutine 700 (see FIG. 7).

Figure 7:
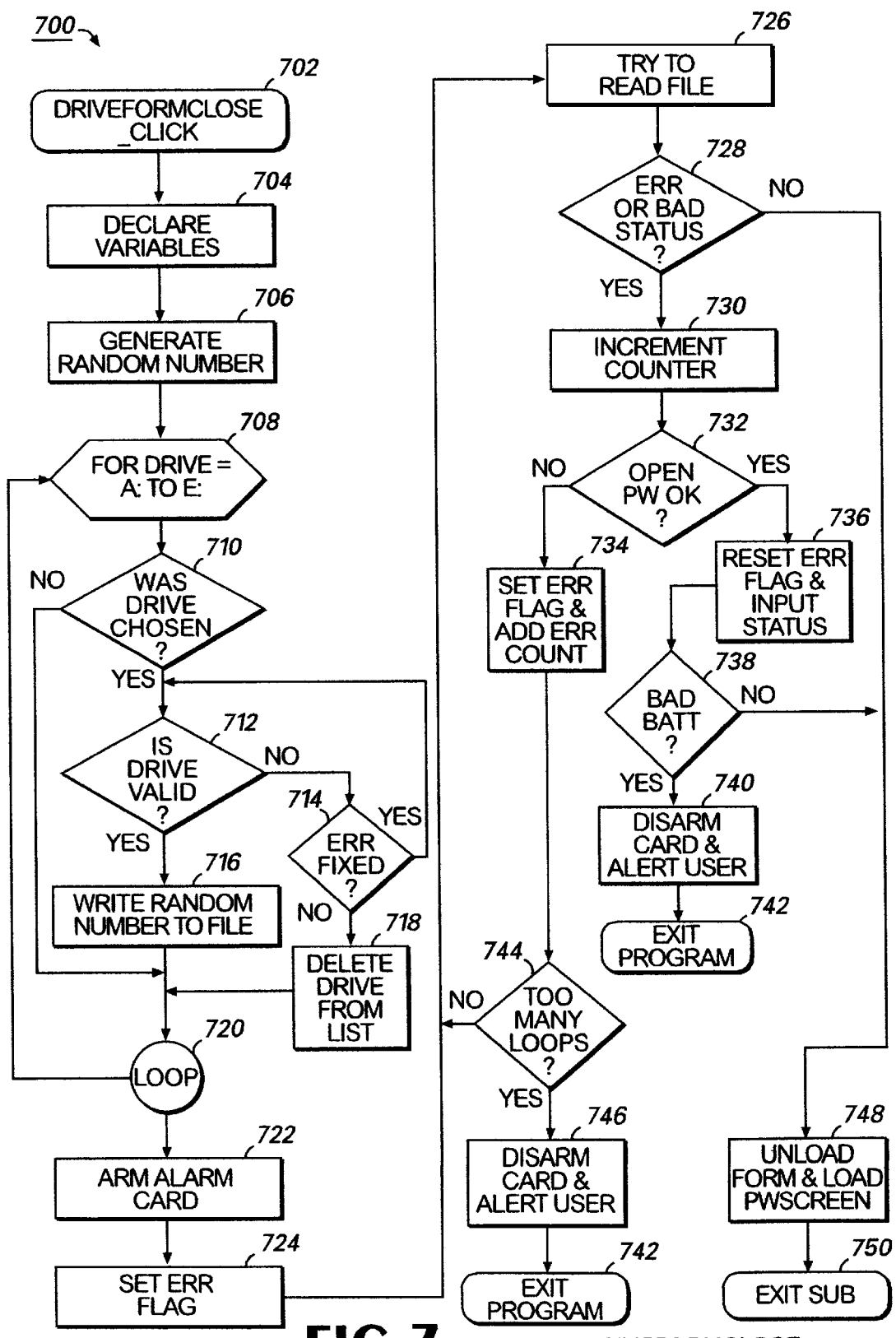
FIG. 7 shows a flowchart of the system of the present invention.

Referring to FIG. 7, the DriveFormClose subroutine 700 performs several hardware checks and declares and initializes necessary variables 704 before passing control to the final screen. It first generates a random number 706. The program then loops 708 through all the writable media (e.g., disk drives a: through f: for MS-DOS based systems) and writes a file containing the random number to each valid writable media. If any previously designated drives fail to accept the file, the user is allowed to try to fix the problem or have that drive removed from the list of monitored media.

In particular, for each drive, the system first determines whether the drive was chosen 710 for monitoring and, if so, the drive is checked 712 for errors. If an error was found, then the system checks 714 whether the error has been fixed. If not, the drive is removed from the list 718 of drives to be monitored and the loop 720/708 is continued. If the error was fixed, however, the validity of the drive is once again checked 712.

If the drive is valid, then a random number file is output to the drive 716 and the loop is continued. After all flagged and operable writable media have been looped through, the loop terminates.

Next, the program arms the alarm card 722 by calling the hardware interface module with appropriate parameters. This module updates the card status in the password file. An error flag is set 724. Next, the system iteratively attempts to read the password file 726 and checks the card status 728. If the status indicates an error, then a counter is incremented 730 and the password file is checked to see whether it can be opened 732. If the file cannot be opened, the error flag is set and the error count is incremented 734. If the error count is above a preset threshold 744, then the card is disarmed and the user alerted 746 before termination of the program due to the error 742. However, if the number of error loops is below the set threshold, control is passed back to 726 and a further attempt is made to read the password file.

If no error or invalid status was found at 728, then the form is unloaded 748 and the PWScreen is loaded (see infra) and the subroutine exits 750.

On the other hand, if the status was bad or an error occurred and the password file could be opened 732, then the error flag is reset and the card status is queried 736. If the battery condition is bad 738, then the card is disarmed and the user alerted 740 before termination of the program 742. However, if the battery condition is acceptable, then the form PWScreen form 748 is loaded (see infra) and the subroutine exits 750.

c. PWScreen

The secure screen 748 (see FIG. 3, 330), PWScreen cyclically checks each of the designated drives for tamper and causes an alarm to occur by discontinuing a refresh signal to the alarm card.

Referring to FIG. 8, the PWScreen subroutine starts by calling a form load subroutine 800. The subroutine declares necessary variables 802, resets counters 804, and calculates a dummy pass variable 806. The main function of the Form_Load subroutine 800 is to disable the Windows shortcut keys 808 that could allow an intruder to obtain control of the computer. After disabling the keyboard, other input devices and making the system modal, the form load subroutine 800 is exited and control is passed to the timer subroutine 900 (see FIG. 9).

FIG. 9 depicts a focal portion of the system of the present invention, the Timer1_Timer subroutine 900. The subroutine 900 is called every x milliseconds as determined by Timer1's interval property. First, the subroutine declares necessary variables 902, resets counters 904, and calculates a dummy pass variable 906. The system then checks the status of the two tamper flags 908 to see if they were set on a previous cycle. If they were, then the program checks 910 to see if the alarm has timed out. If it has not timed out, then the subroutine exits 914 without sending a refresh signal to the alarm card or allowing the user a chance to enter the password. If the time has expired, immediate alarm flags are set 912.

However, if no tamper flags were set, then a loop 916/946 is entered that cycles once for each drive or other writable media.

The loop first checks to see if a correct password has been entered 918. If so, the card is disarmed 920 and the program ends 922. If the correct password has not yet been entered, the loop continues, but may exit the subroutine 900 if either tamper flag is true. If no tamper has occurred, then the subroutine 900 determines if the drive is a valid one 924. If not, the loop continues with the next writable media 946. However, if the drive is being monitored, the system determines 926 if the drive or drives should be checked on this pass.

In one embodiment, the drives are checked every x cycles where x is a random number between 1 and 10 in order to reduce wear on the writable media, and, particularly, floppy disk drives.

If the drive or drives are to be checked 926, then the random number file is checked 932. If the number file is accessible, then the drives are read 934 and the random number is checked 940. If the number is valid, then a new number is generated and output to the file 942 and a refresh is sent to the hardware 944 before the loop 946/916 is continued. If the floppy drive access time is high (524), an additional refresh signal (now shown) is sent to prevent an alarm. However, if the drives are being checked and the file is not okay, then the error handler subroutine is invoked 936, the tamper flag is set 938, and the subroutine is exited 914.

If the drive was not one of the drives being monitored, a refresh signal is sent also 928. In addition, the integrity of the drive is, in that case, checked 930 and the error handler is called 936, as above, if the drive fails the integrity check. Otherwise, the loop is reentered 946. Completion of the loop further causes exiting 914 of the subroutine 900.

d. Hardware Interface Module

Referring now to FIG. 10, the flowchart depicts the module 1000 that communicates directly with the alarm card ports (hardware). This module 1000 is called with one of several parameters which include a command (one decimal digit), a drive letter designation and the port address in hex. The drive letter designation permits module 1000 know where to find the password file. In one embodiment, the one digit commands correspond to the following actions:

| | |
|---|---|
| 1 | Arm the card |
| 2 | Send two refresh signals |
| 3 | Disarm the card |
| 4 | Find the address of the card |
| 5 | Send one refresh signal |
| 6 | Send three refresh signals |
| 7 | Delay all actions for 2 seconds. |

Cases #1 and #4 both update the card status. When the system invokes either of these two commands, it uses the event flushing commands described above to ensure that the hardware interface module executes in a timely manner.

As shown in FIG. 10, the module parses 1002 the passed command digit and follows one of the enumerated flows. For instance, if the command directs the card to arm itself, the following occurs. The card is armed 1004. Next, the card status is verified 1006 and the card is temporarily disarmed until verification is complete 1008. Next the password file is updated with the new status 1010 and the status is checked 1012. If the status is acceptable, the card is rearmed 1014. Finally, a refresh signal is generated 1016 and the module is exited 1080.

If the command directs two refresh signals be issued, then path 1020 to 1028 performs this function. A single refresh is handled at 1050, while three refreshes are handled at 1060.

Likewise, disarming of the card is handled at 1030 and a delay is handled at 1070.

Finally, a status setting may be sent to the hardware at module 1000. In such a case, the possible address ports are looped through 1032/1038. Each port is read 1034 and its status is checked 1036. If the status is acceptable and the port accessible, then the updated status and address is stored 1040. If the status was not acceptable, then the next port is checked during the loop 1032/1038.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A security system for detecting unauthorized physical access to a computer workstation in operation, the computer workstation including at least one writeable media, the security system comprising:

a) means for creating a data file on the at least one writeable media during the operation of the workstation, wherein the data file has defined characteristics;

b) means for monitoring the writeable media and detecting a change in the defined characteristics of the data file during the operation of the workstation;

c) means, responsive to the detection by the monitoring and detecting means of the change in the defined characteristics of the data file, for generating an alarm signal; and d) means, responsive to the alarm signal generating means, for outputting the alarm signal to a signal processing means.

2. The system of claim 1, wherein the signal processing means is a means for generating an audible alarm.

3. The system of claim 1, wherein the creating means periodically changes the defined characteristics of the data file.

4. The system of claim 1, wherein the data file created by the creating means comprises random data.

5. The system of claim 1, wherein the creating means changes the contents of the data file at a preselected interval.

6. The system of claim 5, wherein the preselected interval is a random interval.

7. The system of claim 1, wherein one of the defined characteristics of the data file is the existence of the file.

8. The system of claim 1, further comprising means for actuating the creating means, the monitoring and detecting means, the generating means, and the outputting means.

9. The system of claim 8, wherein the actuating means comprises:

i) means for querying the workstation operator for an actuating password; and ii) means, responsive to the querying means, for actuating the creating means, the monitoring and detecting means, the generating means, and the outputting means.

10. The system of claim 8, wherein the computer workstation further comprises processing means operable after the security system has been actuated by the actuating means.

11. The system of claim 1, wherein the computer workstation further comprises a first power supply, the security system flier comprising a second power supply means for powering the security system independent of the first power supply of the workstation, whereby interruption of the workstation first power supply does not interrupt power to the security system.

12. A method for detecting unauthorized physical access to a computer workstation in operation, the computer workstation including at least one writeable media, the method comprising:

a) creating a data file on the at least one writeable media during the operation of the workstation, wherein the data file has defined characteristics;

b) monitoring the writeable media and detecting a change in the defined characteristics of the data file during the operation of the workstation;

c) in response to the detection of the change in the defined characteristics of the data file, generating an alarm signal; and d) in response to the alarm signal, outputting the alarm signal to a signal processing means.

13. The method of claim 12, wherein the signal processing means is a means for generating an audible alarm, the method further comprising generating an audible alarm on the alarm generating means.

14. The method of claim 12, further comprising periodically changing the defined characteristics of the data file.

15. The method of claim 12, wherein the data file comprises random data.

16. The method of claim 12, further comprising changing the contents of the data file at a preselected interval.

17. The method of claim 12, wherein the preselected interval is a random interval.

18. The method of claim 12, wherein one of the defined characteristics of the data file is the existence of the file.

19. The method of claim 12, further comprising querying the workstation operator for an actuating password.

20. The method of claim 12, wherein the computer workstation further comprises processing means operable after the security system has been actuated by the actuating means.

21. The method of claim 12, wherein the computer workstation further comprises a first power supply, the method further comprising providing a second power supply means for powering the security system independent of the first power supply of the workstation, whereby interruption of the workstation first power supply does not interrupt power to the security system.

\* \* \* \* \*